2,738,030

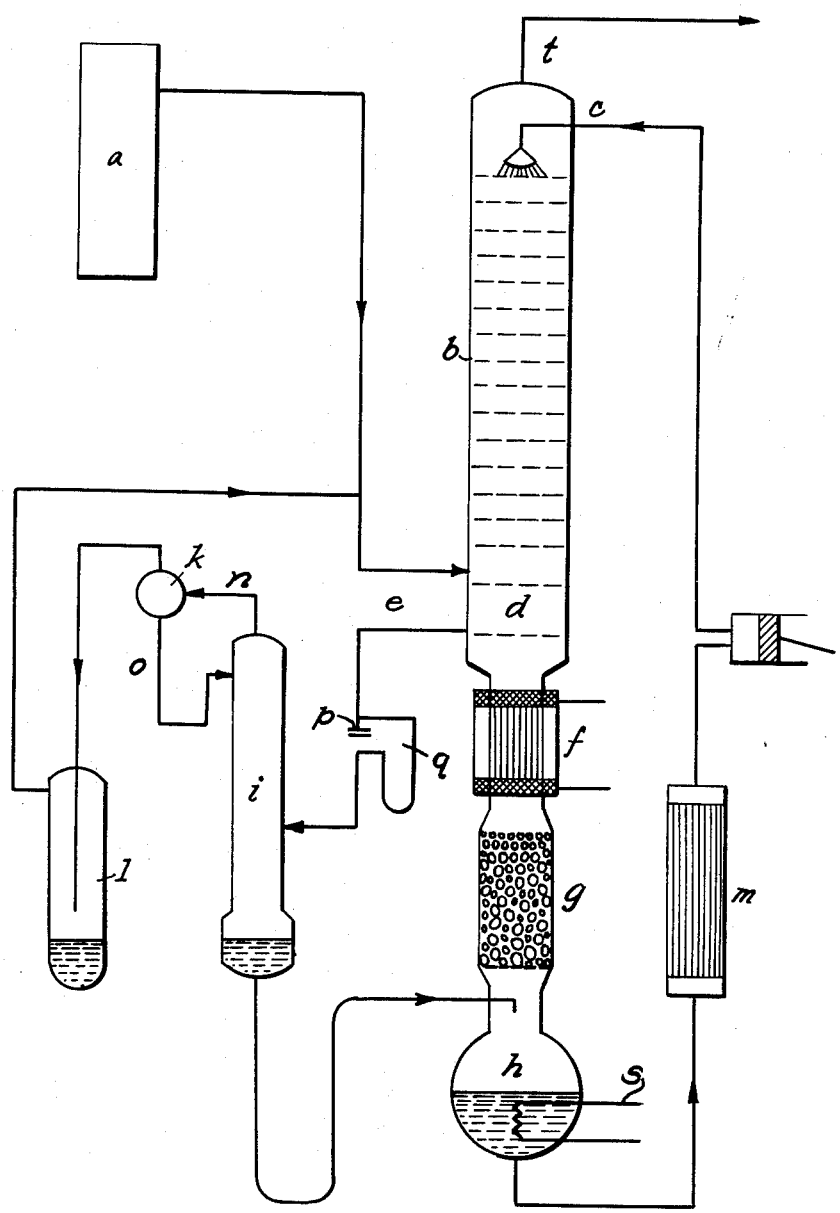

SEPARATION OF FLOWING GAS MIXTURES

Rudolf Keller, Mannheim, Ernst Keyssner, Ludwigshafen (Rhine), Alfred Muenster, Heidelberg, and Peter Pfaff, Neustadt (Haardt), Germany, assignors to Badische Anilin- & Soda-Fabrik Aktiengesellschaft, Ludwigshafen (Rhine), Germany Application September 26, 1952, Serial No. 311,678

Claims priority, application Germany October 5, 1951

6 Claims. (Cl. 183—115)

This invention relates to a process for separating flowing gas mixtures by extraction with liquids.

For the separation of liquids the boiling points of which are close together, it is known to trickle the vapors of the liquid mixture which are ascending in the distillation column with a difficultly volatile auxiliary liquid and thereby to enrich one of the components to be separated in the auxiliary liquid.

We have now found, contrary to expectation, that mixtures of flowing gases having similar solubility properties can be separated very well from each other by washing them with a solvent flowing in countercurrent contact, which is preferably in a finely divided state, while maintaining a fall in temperature which is in the opposite direction to the flow of solvent.

The process is especially suitable for the extraction of gaseous substances which are present only in small amounts in gas mixtures and such as are formed for example as by-products in many technical processes and which can only be separated with difficulty by a normal extraction by reason of their similar solubility properties to those of the main component of the gas mixture. The process may be employed with special advantage for the separation of the reaction product from the reaction of acetylene and hydrocyanic acid to form acrylonitrile.

The process may be carried out for example in an extraction column into which the extraction liquid, if desired cooled, is trickled at the top and to which the gases to be separated are supplied at the bottom, the lower part of the extraction column being heated. For working up the reaction product from the reaction of acetylene and hydrocyanic acid, there may be employed for the washing of the gas mixture organic liquids in which acrylonitrile and the by-products formed, as for example monovinylacetylene, divinylacetylene, acetaldehyde and vinyl chloride, have a better solubility than the acetylene employed in excess in the reaction. Such liquids are for example acrylonitrile and inert organic compounds of high boiling point, such as aliphatic or cyclic hydrocarbons, alcohols, acids, esters, ethers, acetals or saturated nitriles. By working in this way, the washing liquid becomes saturated with acetylene at the top end of the column, so that the acetylene expelled from the liquid trickling down by heat escapes upwardly and the by-products present in small amounts in the reaction gases become enriched in the extraction liquid until at a point determined by the temperature and the condensation conditions the limit of its solubility is reached. In this process there is therefore a distillative extraction, i. e. an extraction the effect of which is enhanced by a superimposed distillation.

Since in the neighborhood of the boiling point of monovinylacetylene (which is at $+5°$ C.) its solubility in acrylonitrile markedly increases with falling temperature, while the solubility of acetylene increases only relatively little by a fall of temperature from room temperature to $0°$ to $+5°$ C., it is preferable to work, at least in the upper part of the washing column, at temperatures of $0°$ to $5°$ C.; lower or higher temperatures, as for example $30°$ C., are however possible depending on the nature of the solvent.

In order to produce the fall in temperature, the lower part of the extraction column may be heated, for example to $60°$ to $80°$ C., by a heating coil, or a circulatory heater or by a heated still in which the extraction liquid collects at the bottom of the washing aggregate. The still may also be separate from the washing tower, and if desired may be provided also with a column, the expelled gases and vapors being returned to the washing tower, whereby a considerable saving in energy can be obtained by an interposed heat-exchanger.

It is also possible to heat the bottom of the extraction column to a relatively low temperature, as for example to $20°$ to $40°$ C., and to free the preheated solvent completely from the readily volatile components in a second column. The readily volatile components are returned from the top of the second column to the first column.

The temperature at the bottom of the washing column or in the still is preferably high enough to drive out the dissolved substances as completely as possible, because then the solvent can be directly used again as washing agent after suitable cooling. It is preferable to heat the extraction agent employed up to its boiling point. If it is necessary in order to expel the gases dissolved at the top of the column to supply to the extraction agent so much heat that the desired drop in temperature between the top of the column and the bottom or the still cannot be maintained, then a part of the heat supplied must be led away by the provision of a cooler in the lower part of the column or in the return pipe for the vapors from the separate still.

The removal of the substances dissolved and enriched in the extraction agent can be effected in various ways. For example a part of the solution may be withdrawn from the extraction column at a suitable place, the position of which is dependent on the temperatures maintained, the nature of the solvent and the concentration of the substances to be extracted in the gas stream and which may be readily determined experimentally, and freed from the dissolved substances in known manner, preferably by distillation. The solvent is then returned to the extraction. Or a partial stream of the gases enriched in difficultly volatile components can be withdrawn and the enriched substances separated therefrom by condensation at low temperatures, the condensation being facilitated by compression of the gases or vapors. It is also possible, when the still is separate from the washing column, to subject the whole of the gases or vapors leaving the still to a condensation at normal or increased pressure and to return the non-condensable gases to the washing column.

In the washing of the reaction products from the reaction of acetylene and hydrocyanic acid, the acrylonitrile contained in the reaction gas also dissolves in the washing liquid; it can be recovered therefrom by distillation after the lower boiling components have been expelled as above described.

The process may also be carried out under increased pressure, preferably at 1 to 30 atmospheres excess pressure. When working under increased pressure larger amounts of gas dissolve in the extraction agent employed, corresponding to the higher partial pressure of the components of the gas mixture, whereby the amount of extraction agent can be reduced considerably. A further advantage of working under pressure is that extractions may thereby be carried out at room temperature or slightly higher or lower temperatures at which under normal pressure expenditure of energy would be necessary for cooling. Accordingly it is preferred to carry out the pressure treatment at 20° to 40° C. It is possible, however, to use higher or lower temperatures. The employment of lower temperatures is advantageous when very readily volatile components are to be extracted from a gas mixture. In such cases it is preferable to carry out the extraction at temperatures which lie somewhat below the condensation temperature of the component or components to be washed out.

The solvent enriched with one or more components of the gas mixture, or a partial stream of the same, can if desired be cooled after the extraction, whereby upon releasing the pressure those extracted components of the gas mixture are mainly expelled of which the boiling point lies above the temperature set up. The temperature may also be raised before or during the pressure release; however, so that practically all gaseous components are expelled, the resulting gas mixture being separated into its components by known methods.

In the case of gas mixtures which are difficult to separate, the process may be used repeatedly, whereby a practically complete separation of the components is possible.

The following examples, given with reference to the accompanying diagrammatic drawing, will further illustrate this invention but the invention is not limited to these examples or to the apparatus shown in the drawing.

Example 1

Acrylonitrile is prepared from acetylene and hydrocyanic acid by means of an aqueous solution of cuprous chloride in an apparatus $a$. 50 to 60 litres of circulating gas, containing acrylonitrile, acetylene, monovinylacetylene, acetaldehyde and higher boiling components, are withdrawn per hour from the apparatus $a$ and washed in a glass bell tray column $b$ having 20 trays. The wash liquid is acrylonitrile introduced at $c$ at a rate of 1 litre per hour. The acrylonitrile introduced at $c$ and the column $b$ are cooled to 0° C. Beneath the column $b$ there is an intermediate portion having a tray $d$ and a pipe $e$ for running off or tapping the washing liquid. Beneath that there is a short condenser $f$, then a small column $g$ filled with Raschig rings and finally a flask $h$ provided with means for heating its contents, such as a heating element $s$. The descending acrylonitrile is heated to boiling point in the flask $h$. The condenser $f$ is regulated so that a temperature of 30° to 35° C. prevails on the intermediate tray $d$ above the same. Acrylonitrile is pumped out from the flask $h$ at a rate determined by the rate at which it flows into the flask, is cooled at $m$ and returned to the column $b$ at $c$.

From the intermediate tray $d$ about one quarter to one fifth of the acrylonitrile is withdrawn through the pipe $e$ and freed from the dissolved, readily volatile substances, including acetylene, monovinylacetylene, acetaldehyde and higher boiling components, in a small distillation apparatus $i$. In pipe $e$ is a choker valve $p$ and a differential pressure meter $q$, for measuring the difference in pressure in front of and behind the choker valve. The acrylonitrile then flows back into the flask $h$. The gases and vapors expelled in the distillation apparatus $i$ first flow through a pipe $n$ to a dephlegmator $k$ cooled to 0° C. arranged above the distillation apparatus $i$. Liquid is returned from the dephlegmator to apparatus $i$ through a pipe $o$. Gases and vapors from the dephlegmator $k$ are then cooled to —30° C. in a condensation vessel $l$. The uncondensed gas, which consists of 90 volumes of acetylene and 10 volumes of monovinylacetylene and the amount of which amounts to only 1 litre in 24 hours, is returned to the washing column $b$. During the course of 48 hours, about 202 grams of condensate collect in the vessel $l$. It consists of 152 grams of monovinylacetylene, 17 grams of acetaldehyde, 30 grams of acetylene and 3 grams of components of higher boiling point.

The acrylonitrile present in the reaction gas is condensed in the washing tower $b$ and augments the amount of the acrylonitrile used for washing, from which a corresponding amount is withdrawn from time to time. Acetylene is removed at $t$, at the top of column $b$.

Example 2

375 litres of a gas mixture of 88 volumes of acetylene and 12 volumes of monovinylacetylene are compressed to 5 atmospheres and then washed in the course of an hour with 1 litre of acrylonitrile in the apparatus described in Example 1. The acrylonitrile supplied at the top of the column $b$ at $c$ is cooled to 0° C. The monovinylacetylene dissolves practically completely, together with a small amount of the acetylene, in the acrylonitrile trickling down. The acrylonitrile in the flask $h$ is heated to about 100° C. and the condenser $f$ is regulated so that the intermediate tray $d$ has a temperature of 40° C. About one quarter to one fifth of the acrylonitrile is withdrawn from the intermediate tray $d$ and freed from the readily volatile components by distillation in $i$. The gases and vapors expelled from the distillation apparatus $i$ are cooled to —30° C. in the vessel $l$. The small uncondensed residual stream is returned to the column $b$. By the cooling to —30° C. there are obtained 684 grams of condensate consisting of 520 grams of monovinylacetylene (corresponding to 89% of the total monovinylacetylene) and 64 grams of acetylene.

Example 3

The extraction is carried out in the same apparatus as in Example 2 and with the same gas mixture compressed to 5 atmospheres. The stream of acrylonitrile withdrawn from the intermediate tray $d$ is, however, released from pressure after the cooling to —30° C. A mixture of 90 normal litres of acetylene and 20 normal litres of monovinylacetylene escapes and is returned to the column $b$. The monovinylacetylene is then distilled off from the acrylonitrile by raising the temperature, in distillation apparatus $i$, whereby a gaseous mixture of 533 grams of monovinylacetylene and 12 grams of acetylene is expelled from apparatus $i$, which can be freed from the residual amount of acetylene by fractionation or cooling.

What we claim is:

1. A process for separating the reaction products obtained by the synthesis of acrylonitrile from acetylene and hydrocyanic acid which comprises extracting these reaction products in the form of a gaseous mixture with finely distributed acrylonitrile, the extraction being carried out in a column into which the reaction products from the synthesis of acrylonitrile are introduced towards the bottom and the acryonitrile used as extraction solvent towards the top of the column, the lowermost part of the column being heated to maintain a temperature drop in the opposite direction to the flow of the organic liquid.

2. A process for separating the reaction products obtained by the synthesis of acrylonitrile from acetylene and hydrocyanic acid which comprises extracting these reaction products in the form of a gaseous mixture with finely distributed acrylonitrile in a column into which the reaction products from the synthesis of acrylonitrile are introduced towards the bottom and the acrylonitrile extraction solvent is introduced towards the top, maintaining a temperature of about 0° C. to 5° C. in the upper part of the column, and heating the lower part of the column to maintain a temperature drop in the opposite direction to the flow of the extraction solvent.

3. A process for separating the reaction products obtained by the synthesis of acrylonitrile from acetylene and hydrocyanic acid which comprises extracting these reaction products in the form of a gaseous mixture with finely distributed acrylonitrile in a column into which the reaction products from the synthesis of acrylonitrile are introduced towards the bottom and the acrylonitrile extraction solvent is introduced towards the top, maintaining a temperature of about 0° C. to 5° C. in the upper part of the column, and maintaining a temperature of about 20° C. to 40° C. in the lowermost part of the column.

4. A process for separating the reaction products obtained by the synthesis of acrylonitrile from acetylene and hydrocyanic acid which comprises extracting these reaction products in the form of a gaseous mixture with finely distributed acryonitrile in a column into which the reaction products from the synthesis of acrylonitrile are introduced towards the bottom and the acrylonitrile extraction solvent is introduced towards the top, collecting the liquid from the bottom of the column in a still, maintaining a temperature of about 0° C. to 5° C. in the upper part of the column, maintaining a temperature of about 20° C. to 40° C. in the lowermost part of the column by heating the liquid in the still to about 20° C. to 40° C. and conducting the vapors to the bottom of the column, withdrawing a liquid side stream at a point adjacent said lowermost part of the column, separating the more volatile of the dissolved substances in the side stream by distillation, and returning the more volatile substances to the column.

5. A process for separating the reaction products obtained by the synthesis of acrylonitrile from acetylene and hydrocyanic acid which comprises extracting these reaction products in the form of a gaseous mixture with finely distributed acrylonitrile in a column into which the reaction products from the synthesis of acrylonitrile are introduced towards the bottom and the acrylonitrile extraction solvent is introduced towards the top, collecting the liquid from the bottom of the column in a still, maintaining a temperature of about 0° C. to 5° C. in the upper part of the column, heating the liquid in the still to about 60° C. to 80° C., cooling the vapors ascending from the still sufficiently to maintain a temperature of about 20° C. to 40° C. in the lowermost part of the column, and conducting the cooled vapors to the bottom of the column.

6. A process as claimed in claim 1 wherein the extraction is carried out under superatmospheric pressure.

References Cited in the file of this patent

UNITED STATES PATENTS

| | | |
|---|---|---|
| 1,989,273 | Grimme et al. | Jan. 29, 1935 |
| 2,048,838 | Carter et al. | July 28, 1936 |
| 2,180,386 | Balcar | Nov. 21, 1939 |
| 2,236,964 | Babcock | Apr. 1, 1941 |
| 2,324,854 | Kurtz | July 20, 1943 |
| 2,437,230 | Morris | Mar. 2, 1948 |
| 2,487,859 | Dickey et al. | Nov. 15, 1949 |
| 2,516,507 | Deming | July 25, 1950 |
| 2,522,059 | Ray et al. | Sept. 12, 1950 |
| 2,526,676 | Lovett | Oct. 24, 1950 |
| 2,608,270 | McDonald et al. | Aug. 26, 1952 |
| 2,661,812 | Gilmore | Dec. 8, 1953 |

FOREIGN PATENTS

| | | |
|---|---|---|
| 579,787 | Great Britain | Aug. 15, 1946 |